(No Model.)
J. L. KERSTETTER.
BREAD CUTTER.
No. 328,228. Patented Oct. 13, 1885.
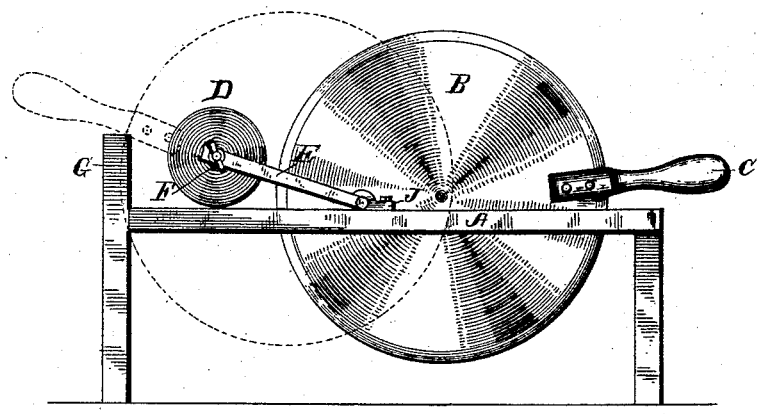
Fig. 1.
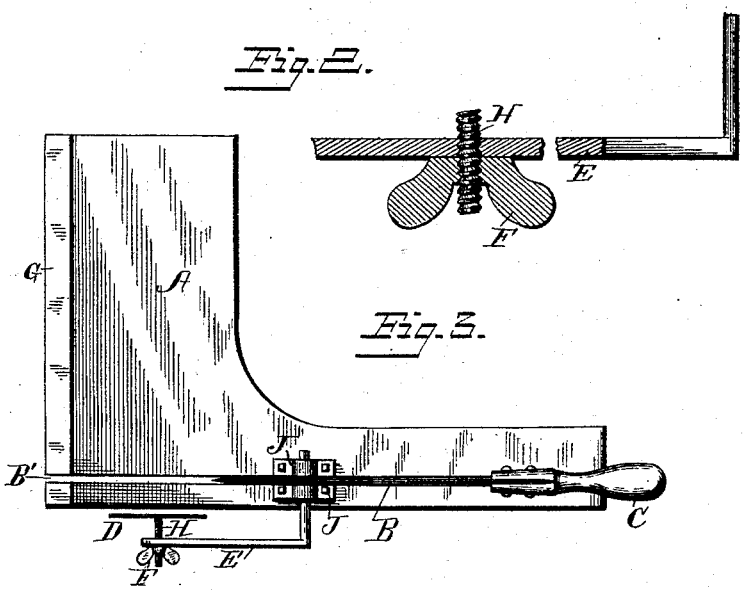
Fig. 2.
Fig. 3.
Witnesses:
L. C. Hills,
W. B. Masson
Inventor:
James L. Kerstetter
By his atty
James C. Boyce

UNITED STATES PATENT OFFICE.

JAMES L. KERSTETTER, OF BRADFORD, PENNSYLVANIA, ASSIGNOR OF ONE-HALF TO S. H. ALTICE, OF BOLIVAR, NEW YORK.

BREAD-CUTTER.

SPECIFICATION forming part of Letters Patent No. 328,228, dated October 13, 1885.

Application filed December 4, 1884. Serial No. 149,496. (No model.)

*To all whom it may concern:*

Be it known that I, JAMES L. KERSTETTER, a citizen of the United States, residing at Bradford, in the county of McKean and State of Pennsylvania, have invented certain new and useful Improvements in Bread-Cutters; and I do hereby declare the following to be a full, clear, and exact description of the invention, such as will enable others skilled in the art to which it appertains to make and use the same.

Figure 1 is a side elevation of my improved bread-cutter. Fig. 2 is a detailed view, partly in section, of the gage. Fig. 3 is a top view.

The object of the invention is to provide a device by which bread can be sliced, and the slices can be made of any thickness (within reasonable limits) desired.

My improved bread-cutter consists of a suitable frame, A G, which may be made of any desired size or shape. The loaf of bread to be cut rests upon the wing of the table at A in Fig. 3, and one side of the loaf rests against the upright G, which projects above the table a sufficient distance to form a brace for the loaf.

The table A and upright G are provided with the narrow slot B', in which is pivoted at J the circular knife B. The handle C is firmly riveted to the knife B, and when such handle C is thrown over toward and onto the upright G, as shown in dotted lines, it will shear through a loaf of bread placed over the slot B', as such knife B is pivoted near its circumference opposite the handle C.

When the edge on one side of the knife is worn dull, it can be reversed and the other edge worn out. If desirable, several points of attachment for the handle and pivot can be provided, so that all parts of the circular knife B can be worn out before resharpening.

The circular knife B is mounted on the shaft E, which is fastened to the table A by the cap J. It is fastened to said shaft so that the shaft moves with the motion of the knife B. Said shaft E is bent at right angles, and its end is flattened, and perforated, and screw threaded, so as to receive the screw H, upon the end of which is mounted the disk D. The shaft E is so fastened to the knife B that when such knife is in the position shown in Fig. 1 the disk D is above the table, and when the knife B is rotated the disk D is necessarily turned below the table.

The distance of the disk D from the slot B' governs the thickness of the slice cut from the loaf. It is therefore the gage. Its distance from the slot B' is regulated by screwing it back or forth in the arm E, and it is fastened in the desired position by the jam-nut F.

The loaf to be cut is placed upon the table, with its end resting against the gage D. The slice is then sheared off, the knife thrown into its first position, the cut slice removed, and the loaf pushed again against the gage D. By this means as many slices as desired of exactly uniform thickness can be cut. The slices cut by the circular knife are not only uniform in thickness, but are neatly and cleanly cut, the circular form of the knife being the best that has been devised for the purpose.

I am aware that it is not broadly new to provide a bread-cutting machine with a rotary knife which is eccentrically journaled or pivoted, and with a gage for regulating the thickness of the slices. These devices I do not broadly claim.

I am also aware that it is not new to provide a knife with a handle and gage all turning on the same pivot, and, further, that it is not new to provide a knife or cutter with a gage which is adjustable toward or from the material to be cut. These constructions and combinations I do not broadly claim; but

I claim as my invention—

1. The circular cutter B, which is mounted eccentrically on its shaft E, in combination with a handle, C, attached to said cutter, and a gage plate or disk, D, attached to a bent arm of said shaft, said handle being on the opposite side of the cutter from said shaft, substantially as set forth.

2. The bent shaft E, flattened and perforated at its outer end, in combination with the cutter B, mounted on one part thereof, the screw H, working through another part thereof, the nut F, applied to said screw, and the gage disk or plate D, attached to said screw, and arranged opposite that part of the feeding-table which holds the material to be cut, substantially as set forth.

In testimony whereof I affix my signature in presence of two witnesses.

JAMES L. KERSTETTER.

Witnesses:
JAMES C. BOYCE,
M. L. LYNCH.